US012633028B2

(12) United States Patent
Dixit et al.

(10) Patent No.: US 12,633,028 B2
(45) Date of Patent: May 19, 2026

(54) GENERATING VIDEO FROM AN IMAGE BASED ON VARIABLE SPEED

(71) Applicant: Adobe Inc., San Jose, CA (US)

(72) Inventors: Gaurav Dixit, Kanpur (IN); Vikas Sharma, Gurgaon (IN); Nishant Kumar, Siliguri (IN); Ankur Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 226 days.

(21) Appl. No.: 18/194,833

(22) Filed: Apr. 3, 2023

(65) Prior Publication Data

US 2024/0331258 A1 Oct. 3, 2024

(51) Int. Cl.
*G06T 13/80* (2011.01)
*G06T 11/20* (2006.01)

(52) U.S. Cl.
CPC ............ *G06T 13/80* (2013.01); *G06T 11/203* (2013.01)

(58) Field of Classification Search
CPC .............................. G06T 13/80; G06T 11/203
See application file for complete search history.

(56) References Cited

U.S. PATENT DOCUMENTS

| | | | |
|---|---|---|---|
| 8,300,055 B2* | 10/2012 | Niles ................... | G06F 3/04847 |
| | | | 715/833 |
| 2019/0180491 A1* | 6/2019 | Hassan ................... | G06T 17/10 |
| 2023/0115094 A1* | 4/2023 | Zhu ........................... | G06T 7/70 |
| | | | 345/473 |
| 2024/0010122 A1* | 1/2024 | Nagata ................... | B60Q 1/444 |

OTHER PUBLICATIONS

Willett, Nora S., et al. "A mixed-initiative interface for animating static pictures." Proceedings of the 31st annual ACM symposium on user interface software and technology. 2018. (Year: 2018).*
Izdebski, Ł., Kopiecki, R., Sawicki, D. (2020). Bézier Curve as a Generalization of the Easing Function in Computer Animation. In: Magnenat-Thalmann, N., et al. Advances in Computer Graphics. CGI 2020. Lecture Notes in Computer Science( ), vol. 12221. Springer, Cham. (Year: 2020).*
Holynski, Aleksander, et al. "Animating pictures with eulerian motion fields." Proceedings of the IEEE/CVF Conference on Computer Vision and Pattern Recognition. 2021. (Year: 2021).*
Reinert, Bernhard, Tobias Ritschel, and Hans-Peter Seidel. "Animated 3D creatures from single-view video by skeletal sketching." Graphics Interface. 2016. (Year: 2016).*

* cited by examiner

*Primary Examiner* — Daniel F Hajnik
*Assistant Examiner* — Chris Alejandro Puntier
(74) *Attorney, Agent, or Firm* — FIG. 1 Patents

(57) ABSTRACT

In implementation of techniques for generating video from an image based on variable speed, a computing device implements a variable speed system to receive a static digital image displayed in a user interface, an indication of a movement direction, and an indication of a variable rate of speed. The variable speed system generates a digital video based on the static digital image, the digital video having pixels that move in the movement direction at a speed that varies based on the variable rate of speed based on pixels from the static digital image. The variable speed system then displays the digital video in the user interface.

20 Claims, 10 Drawing Sheets

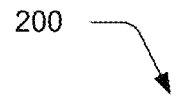
200
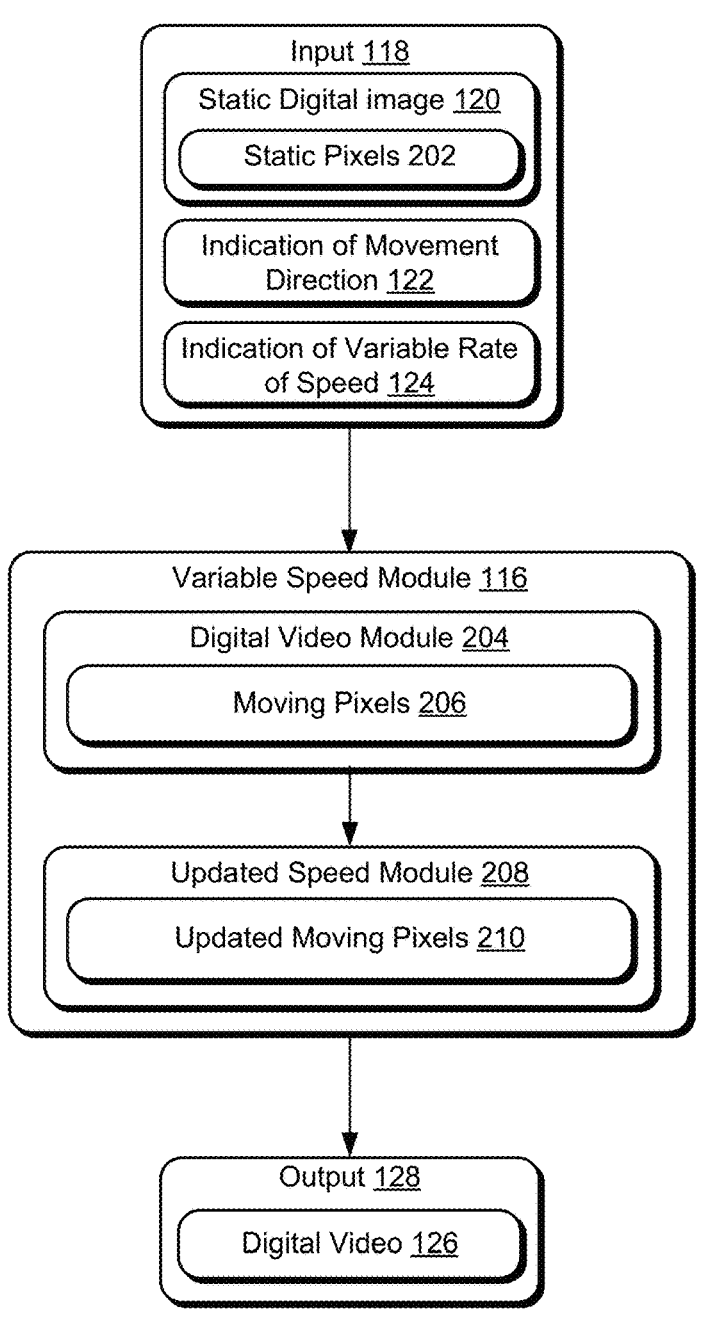
Input 118
Static Digital image 120
Static Pixels 202
Indication of Movement
Direction 122
Indication of Variable Rate
of Speed 124
Variable Speed Module 116
Digital Video Module 204
Moving Pixels 206
Updated Speed Module 208
Updated Moving Pixels 210
Output 128
Digital Video 126
Fig. 2

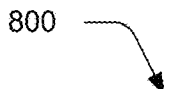

800

802
Receive an input including a static digital image displayed in a user interface, an indication of a movement direction, and an indication of a variable rate of speed

804
Generate a digital video based on the static digital image, the digital video having pixels that move in the movement direction at a speed that varies based on the variable rate of speed based on pixels from the static digital image

806
Display the digital video in the user interface

Fig. 8

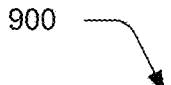

900

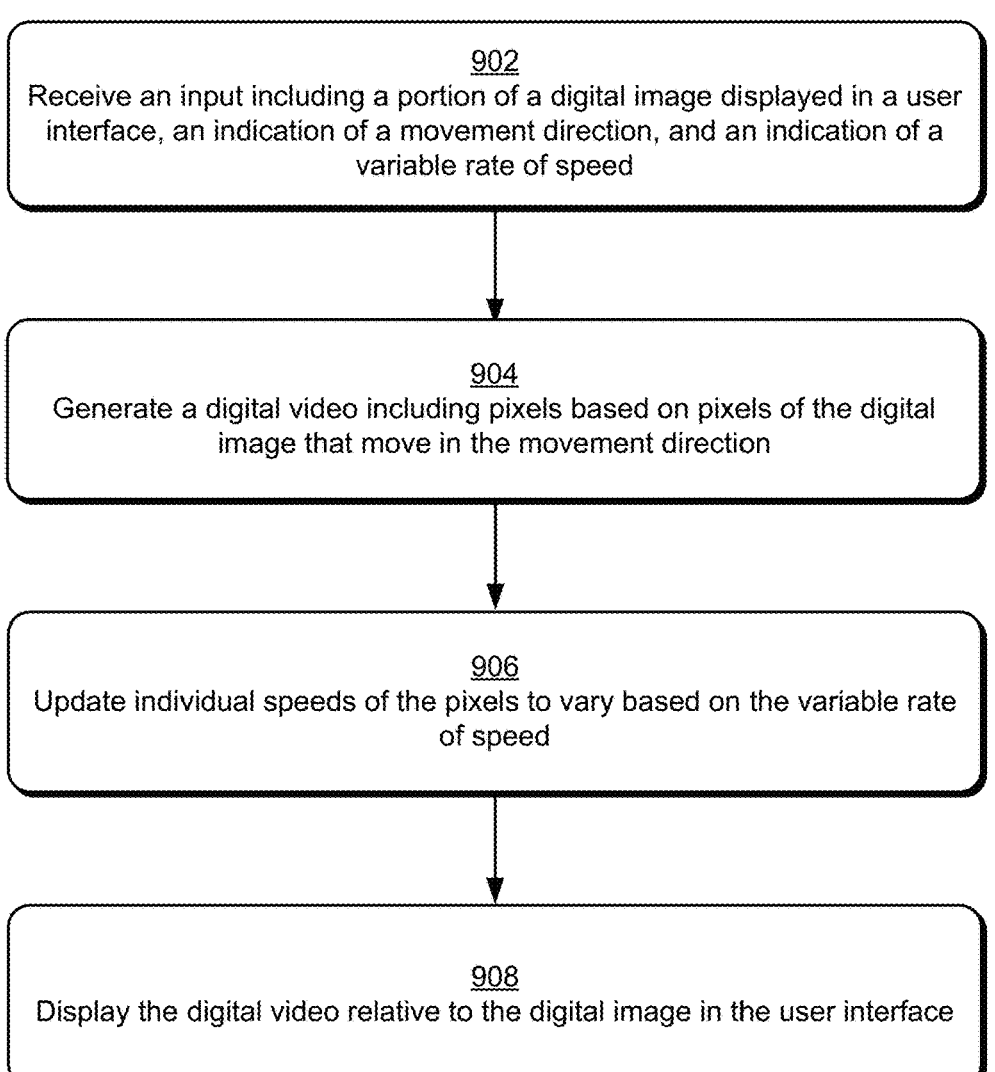

902
Receive an input including a portion of a digital image displayed in a user interface, an indication of a movement direction, and an indication of a variable rate of speed

904
Generate a digital video including pixels based on pixels of the digital image that move in the movement direction

906
Update individual speeds of the pixels to vary based on the variable rate of speed

908
Display the digital video relative to the digital image in the user interface

GENERATING VIDEO FROM AN IMAGE BASED ON VARIABLE SPEED

BACKGROUND

Digital images are displayed in a user interface using collections of pixels. Pixels are basic units of a digital image that represent a single color or level of brightness displayed in the user interface. In static digital images, pixels are static and do not move. Existing image processing systems use pixels from static digital images to create animations. However, techniques used to create animations cause errors in some instances, resulting in visual inaccuracies, computational inefficiencies, and increased power consumption.

SUMMARY

Techniques and systems for generating video from an image based on variable speed are described. In an example, a variable speed system receives a static digital image displayed in a user interface, an indication of a movement direction, and an indication of a variable rate of speed.

The variable speed system generates a digital video based on the static digital image, the digital video having pixels that move in the movement direction at a speed that varies based on the variable rate of speed based on pixels from the static digital image. For example, the variable rate of speed is linear, exponential, logarithmic, sinusoidal, or quadratic. In some examples, the indication of the movement direction is represented as an arrow displayed in the user interface, and a visual characteristic of the indication of the movement direction varies proportionally with the variable rate of speed.

The variable speed system then displays the digital video in the user interface. In some examples, the static digital image is a portion selected by a user from a larger digital image, and the digital video is displayed relative to the larger digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a variable speed module for generating video from an image based on variable speed.

FIG. 8 depicts a procedure in an example implementation of generating video from an image based on variable speed.

FIG. 9 depicts a procedure in an additional example implementation of generating video from an image based on variable speed.

DETAILED DESCRIPTION

Overview

Figure 1:
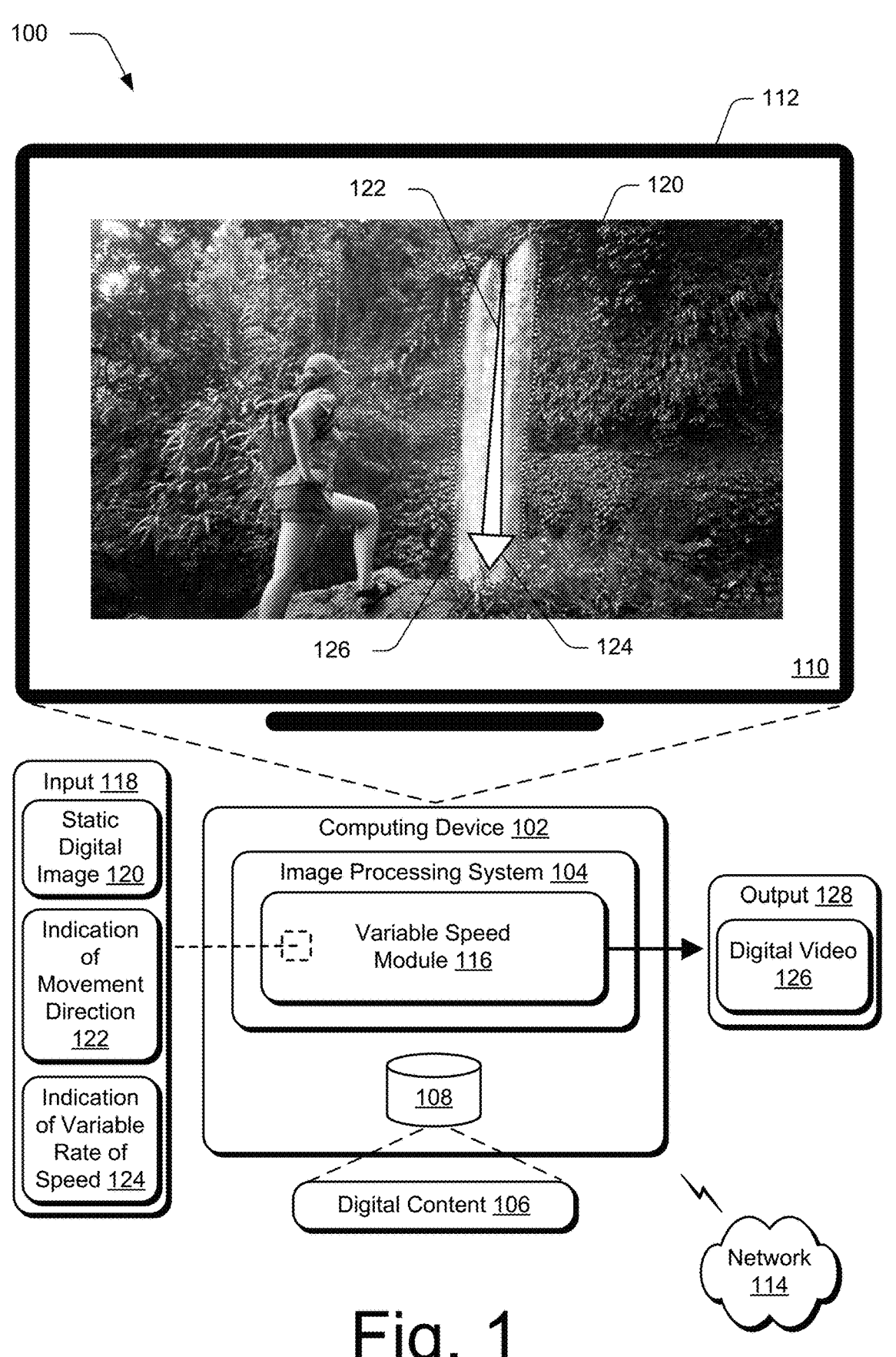
FIG. 1 is an illustration of a digital medium environment in an example implementation that is operable to employ techniques and systems for generating video from an image based on variable speed as described herein.

Digital images are composed of collections of pixels that represent a single color or level of brightness displayed in a user interface. By default, static digital images include static pixels that do not move. However, in some situations, a user wishes to animate portions of a static digital image for aesthetic purposes. For example, a user desires to animate a static digital image that depicts a waterfall by creating a video in which the water of the waterfall appears to move but the content surrounding the waterfall remains static.

Conventional animation systems are capable of animating portions of static digital images by generating a video saved in MP4 or GIF format using pixels from a static digital image that move in a designated direction. However, conventional applications move the pixels at constant speed, which creates unrealistic animations. For example, conventional applications generate a video of a moving waterfall, but the pixels of the waterfall move downward at a constant velocity. This results in an unrealistic video because water falls faster at the bottom of a waterfall than at the top. A conventional solution to fix this problem involves the user adjusting speeds for regions of pixels manually. However, this is time consuming, and the user is unable to replicate linear, exponential, logarithmic, sinusoidal, or quadratic rates of speed by manually adjusting speeds.

Techniques and systems for generating video from an image based on a variable speed are described that overcome these limitations. A variable speed system begins in this example by receiving a portion of a digital image, e.g., that is displayed in a user interface. For example, the portion of the digital image is an area of a digital image that the user desires to animate. In some examples, the user selects the portion of the digital image by drawing an outline of the portion in the user interface using a selection tool.

The variable speed system also receives an indication of a movement direction, which is the direction the user desires the pixels to move once animated. The user indicates the movement direction by drawing an arrow in the user interface. In some examples, the user draws multiple arrows to indicate different movement directions for different areas of pixels in the portion of the digital image.

The variable speed system also receives an indication of a variable rate of speed over time. Examples of a variable rate of speed include linear, exponential, logarithmic, sinusoidal, or quadratic rates of speed. In this example, the user selects exponential acceleration from options displayed in the user interface to apply to the moving pixels of the digital video of the waterfall.

Based on the static digital image, the indication of the movement direction, and the variable rate of speed, the variable speed system automatically generates a digital video that includes moving pixels based on pixels of the digital image that move in the movement direction at a speed that varies based on the variable rate of speed. In some examples, the variable speed system automatically updates individual speeds of the moving pixels at different points in time to vary based on the variable rate of speed. For example, a user input indicating an exponential rate of speed updates the speed of the moving pixels to accelerate exponentially. In this example, updating the moving pixels of the waterfall to accelerate exponentially results in a realistic video of a waterfall. The digital video is then displayed relative to the digital image in the user interface. For example, the digital video of the moving waterfall is overlaid on the digital image so that the waterfall is animated and the remainder of the image is static.

Generating video from an image based on variable speed in this manner overcomes the disadvantages of conventional animation techniques that are limited to generating pixels that move at constant velocity. For example, applying a variable rate of speed results in pixels that change velocity based on movement distance, eliminating steps involved in conventional techniques that use manual speed adjustment for different pixels. This results in a realistic final product that mimics changes in motion that occur in real-life.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for generating video from an image based on variable speed described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a variable speed module 116 which is illustrated as incorporated by the image processing system 104 to process the digital content 106. In some examples, the variable speed module 116 is separate from the image processing system 104 such as in an example in which the variable speed module 116 is available via the network 114.

The variable speed module 116 is configured to generate video based on variable speed by first receiving an input 118 that includes a static digital image 120 displayed in a user interface 110, an indication of a movement direction 122, and an indication of a variable rate of speed 124. For example, the static digital image 120 is an image to animate, the movement direction 122 is the direction of motion for the animation, and the variable rate of speed 124 is the change of speed for the animation. In some examples, the static digital image 120 is a portion of a larger digital image that is selected via one or more inputs for animation. The portion of the larger digital image depicts a specific object or material that is to be animated. Examples of objects to animate include fire, dust, fabric, water, etc.

The variable speed module 116 then generates a digital video 126 based on the static digital image 120, the digital video 126 having pixels that move in the movement direction 122 at a speed that varies based on the variable rate of speed 124 based on pixels from the static digital image 120. For example, pixels of a static digital image 120 depicting fire in a fireplace are used to generate a digital video 126 in which the pixels exhibit movement in an upward direction indicated by a user input at a speed that is slower at the bottom of a depicted flame and faster at the top of the depicted flame, according to the variable rate of speed 124.

The variable speed module 116 then displays the digital video 126 as an output 128 in the user interface 110. In some examples, the digital video 126 is displayed relative to the static digital image 120. In the above example, the digital video 126 depicting the animated fire is displayed over the static digital image 120 so that a portion of the static digital image 120 is animated.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating Video from an Image Based on Variable Speed

FIG. 2 depicts a system 200 in an example implementation showing operation of the variable speed module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, the variable speed module 116 receives an input 118 including a static digital image 120 displayed in a user interface 110. For example, the static digital image 120 includes static pixels 202 that are basic units of the static digital image 120 and represent a single color or level of brightness displayed in the user interface 110. In this example, the static pixels 202 collectively represent the static digital image 120 and do not move.

The input 118 also includes an indication of a movement direction 122. For example, a user draws an arrow in the user interface 110 indicating the movement direction 122, which is the direction in which the user desires the pixels of the static digital image 120 to move to give the appearance that the static digital image 120 is animated.

The input 118 also includes an indication of a variable rate of speed 124. Examples of the variable rate of speed 124 include a linear, exponential, logarithmic, sinusoidal, or quadratic rate of speed. The variable rate of speed 124 also specifies speeding up or slowing down. For example, the indication of the movement direction 122 is a representation having a display characteristic that varies as indicative of relative speeds at respective points in time. In some examples, the variable rate of speed 124 is represented as a thickness of the arrow displayed in the user interface 110 that varies proportionally with the variable rate of speed 124. For example, a rate of speed that increases linearly has an arrow that is thinner at the beginning and is thicker at the end closest to the arrow point, indicating speed that increases along the distance of the arrow, as discussed in detail below with respect to FIG. 5.

The variable speed module 116 also includes a digital video module 204. For instance, the digital video module 204 generates a digital video 126 including moving pixels 206 that move in the movement direction 122. The moving pixels 206 are based on the static pixels 202 of the static digital image 120. The digital video module 204 animates the static pixels 202 in a way that an object depicted in the static digital image 120 appears to move.

The variable speed module 116 also includes an updated speed module 208. The updated speed module 208 generates updated moving pixels 210 based on the variable rate of speed 124 by updating individual speeds of the moving pixels 206 to vary based on variable rate of speed 124. For example, the updated speed module 208 updates the digital video 126 to speed up or slow down the moving pixels 206 based on the variable rate of speed 124. This gives the appearance that the object depicted in the digital video 126 speeds up or slows down along its path of travel. Although this example describes the digital video module 204 and the updated speed module 208 separately, in some examples the variable speed module 116 automatically generates the digital video 126 with moving pixels 210 based on the variable rate of speed 124 without updating speeds.

The output 128 of the variable speed module 116 includes the digital video 126. In some examples, the static digital image 120 is a portion selected by a user from a larger digital image, and the digital video 126 is displayed relative to the larger digital image.

FIGS. 3-7 depict stages of generating video from an image based on variable speed. In some examples, the stages depicted in these figures are performed in a different order than described below.

Figure 3:
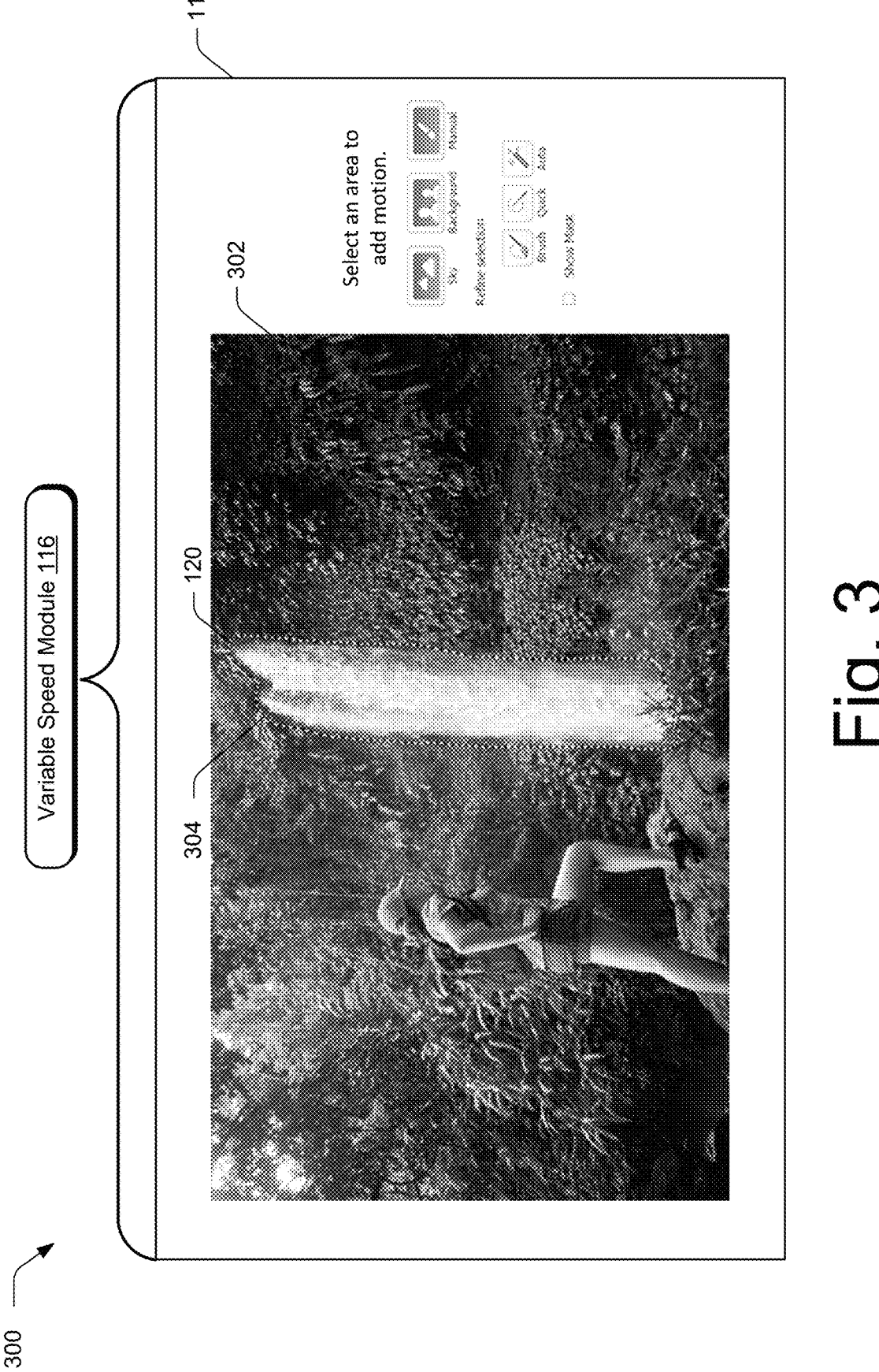
FIG. 3 depicts an example of receiving a static digital image displayed in a user interface.

FIG. 3 depicts an example 300 of receiving a static digital image 120 displayed in a user interface 110. As illustrated, the variable speed module 116 receives a user input a static digital image 120 to animate.

In some examples, the static digital image 120 is a portion of a larger digital image 302 that the user selects. For example, a user draws a boundary line 304 around the portion of the larger digital image 302 displayed in the user interface. This is the portion selected for animation, while the remainder of the digital image remains static. In other examples, the user selects the static digital image 120 by clicking a button in a user interface to automatically select a portion of the static digital image for animation. For example, the user selects a button labeled "Sky" to select the sky depicted in the larger digital image 302 as the static digital image 120 or selects a button labeled "Background" to select the background in the larger digital image 302 as the static digital image 120. Additionally or alternatively, a mask is displayed in the user interface 110 over the static digital image 120 to indicate the portion of the larger digital image 302 that is to be animated. In other examples, the static digital image 120 is an entire digital image that a user selects for animation.

In other examples, a static digital image 120 is selected for animation automatically, without user input. For example, the variable speed module 116 detects a portion of a digital image with uniform texture or pattern that is suitable for animation, using object identification by a machine-learning model, and so forth. Examples of portions of a digital image automatically selected for animation include portions depicting water, clouds, fire, smoke, dust, automobiles, crowds of people, etc.

In this example, the user draws a boundary line 304 around a waterfall in a larger digital image 302 depicted in a user interface 110. This indicates that the portion of the larger digital image 302 that the user desires to animate includes the waterfall.

Figure 4:
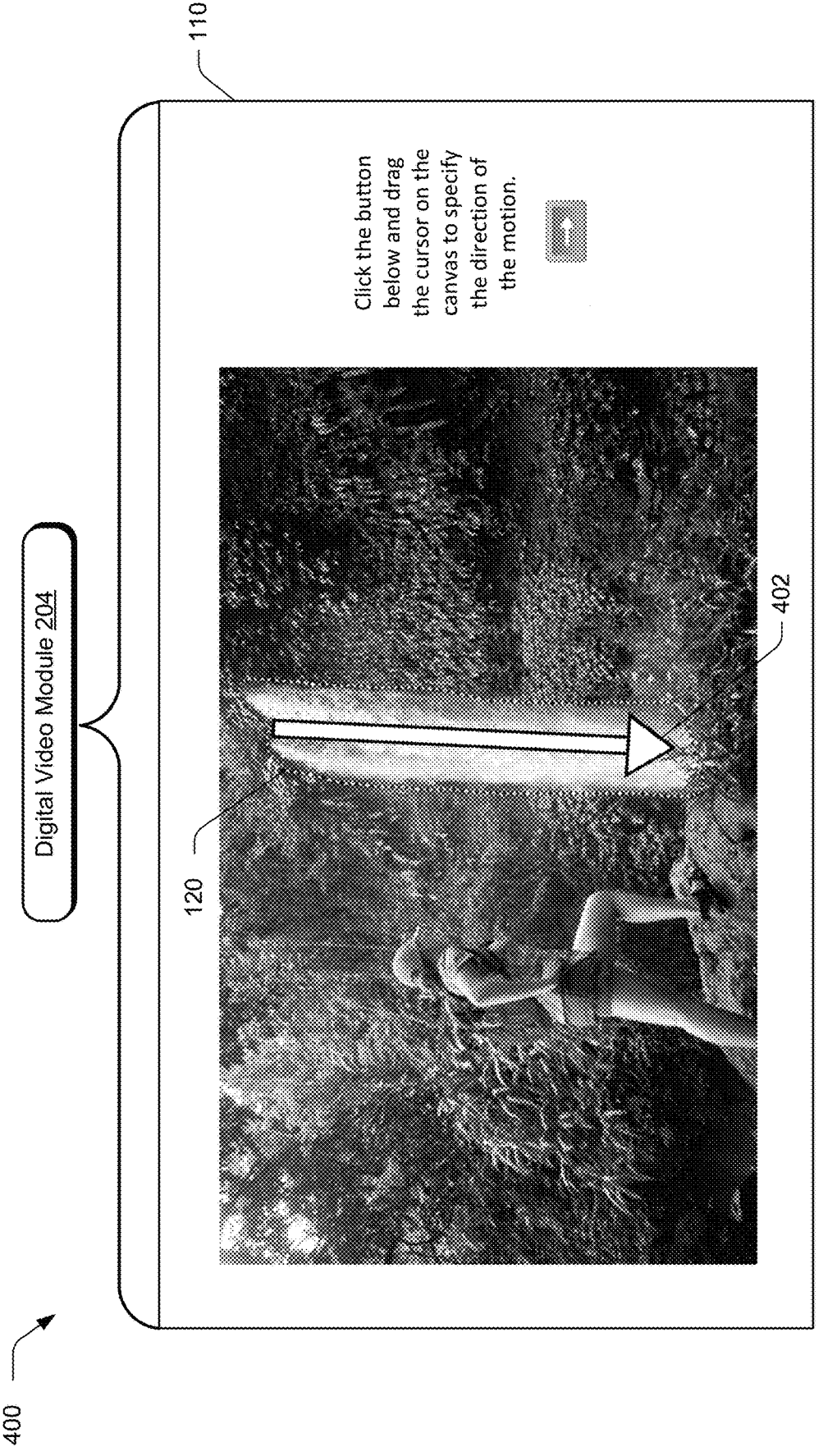
FIG. 4 depicts an example of receiving an indication of a movement direction and generating a digital video including moving pixels that move in the movement direction.

FIG. 4 depicts an example 400 of receiving an indication of a movement direction 122 and generating a digital video 126 including moving pixels 206 that move in the movement direction 122. FIG. 4 is a continuation of the example described in FIG. 3. After the variable speed module 116 receives the static digital image 120, the digital video module 204 receives an indication of a movement direction 122.

For example, the user draws an arrow 402 over the static digital image 120 displayed in the user interface 110 to indicate a desired direction of movement. The pointed end of the arrow points in the direction the user desires the pixels to move. In some examples, the arrow 402 is curved, indicating movement in a curved or rotational trajectory.

In response to receiving the indication of the movement direction 122, the digital video module 204 generates a digital video 126 that includes moving pixels 206 that move in the movement direction 122. For example, the digital video module 204 animates static pixels 202 from the static digital image 120. Once animated, the static pixels 202 become moving pixels 206 that move in the movement direction 122. To achieve this, the digital video module 204 creates a collection of frames using the static pixels 202 and stitches the frames together into a digital video 126.

In this example, the user draws an arrow 402 pointed downward along the path of the waterfall depicted in the static digital image 120 displayed in the user interface 110. In response, the digital video module 204 generates a digital video 126 of the waterfall including moving pixels 206 that move in the movement direction 122 at constant speed.

Figure 5:
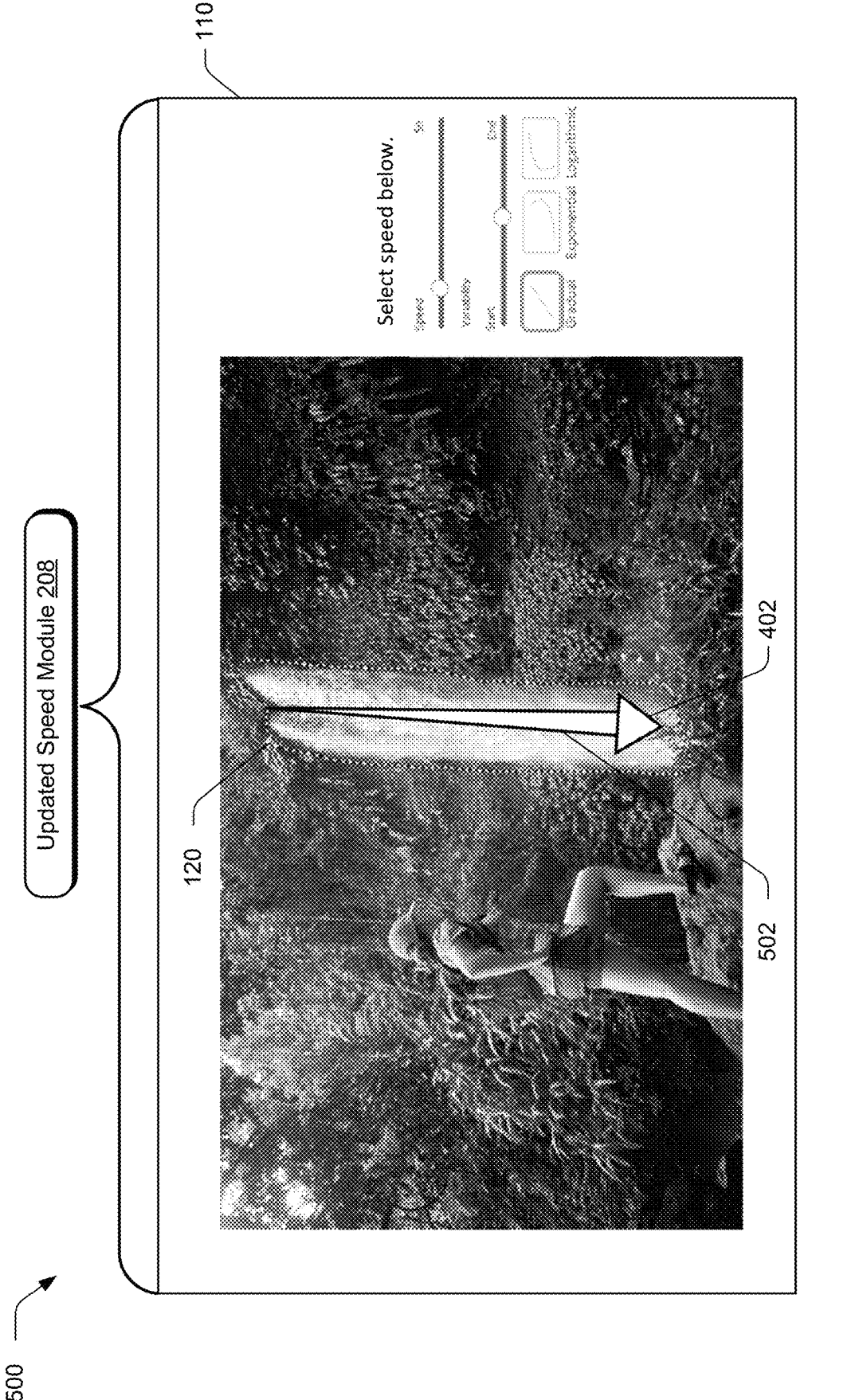
FIG. 5 depicts an example of receiving an indication of a variable rate of speed and updating the moving pixels to vary based on the variable rate of speed.

FIG. 5 depicts an example 500 of receiving an indication of a variable rate of speed 124 and updating the moving pixels 206 to have speeds that vary based on the variable rate of speed 124. FIG. 5 is a continuation of the example described in FIG. 4. After the digital video module 204 generates the digital video 126 including moving pixels 206 that move in the movement direction 122, the updated speed module 208 generates updated moving pixels 210 based on the variable rate of speed 124. Although the digital video module 204 and the updated speed module 208 are described separately, the steps performed by the digital video module 204 and the moving pixels 206 are performed simultaneously in some examples.

For example, the user selects an indication of a speed and the indication of the variable rate of speed 124 by selecting an option displayed in the user interface 110. Examples of a variable rate of speed 124 include linear, exponential, logarithmic, sinusoidal, or quadratic rate of speed. For example, selecting a linear rate of speed increases the movement speed of the moving pixels 206 linearly. The variable rate of speed 124 also specifies speeding up or slowing down.

In some examples, the variable rate of speed 124 is represented as a thickness of the arrow 402 displayed in the user interface 110 that varies proportionally with the variable rate of speed 124. This is displayed as an arrow tail with varying thickness 502. For example, a rate of speed that increases linearly has an arrow that is thinner at the beginning of the arrow tail and is thicker at the end closest to the arrow point, indicating speed that increases along the distance of the arrow 402.

The updated speed module 208 generates updated moving pixels 210 based on the moving pixels 206 by updating speeds of individual pixels based on a varying speed. Varying speed, Fn(x), is calculated using one of the below formulas depending on the variable rate of speed 124 selected:

Linear: C+C*X

Logarithmic: C+C Log(X)

Exponential: $C+e^X$ where C is the base speed selected by the user and X is a variability factor selected by the user. For example, the user selects a variable rate of speed 124 that specifies increasing speed or decreasing speed. Increasing speed results in pixels that speed up proportionally to distance traveled, and decreasing speed results in pixels that slow down proportionally to distance traveled. Additionally or alternatively, the variable rate of speed 124 includes different variations of rate of speed over time. For example, pixel speed increases and then decreases.

In this example, the user selects a button in the user interface labeled "Gradual" (Linear) variable rate of speed. In response, the updated speed module 208 generates updated moving pixels 210 by increasing the speed of the pixels toward the end of the arrow 402. This is represented by the updated speed module 208 in the user interface 110 with an arrow 402 with and an arrow tail with varying thickness 502 that is thicker toward the end of the arrow 402. The digital video 126 including the updated moving pixels 210 gives the appearance that the water of the waterfall speeds up linearly toward the bottom of the waterfall.

In some examples, the variable rate of speed 124 includes different variations of rate of speed over time. For example, the variable rate of speed 124 specifies moving pixels 210 in which water speeds up down the waterfall but then slows when splashing from an object. In this example, this is represented by an arrow 402 displayed in the user interface 110 having an arrow tail with varying thickness 502 that is thicker corresponding to a region of the digital video 126 where the water speeds up and thinner corresponding to a region of the digital video 126 where the water slows down.

The digital video 126 is output for display in the user interface 110. In some examples, the digital video 126 is displayed relative to the larger digital image 302. For example, the digital video 126 of the waterfall is overlaid on the larger digital image 302 that includes the image of the hiker. This gives the appearance that the waterfall is moving while the rest of the image remains static. In some examples, the digital video 126 is saved in MP4 or GIF format.

Figure 6:
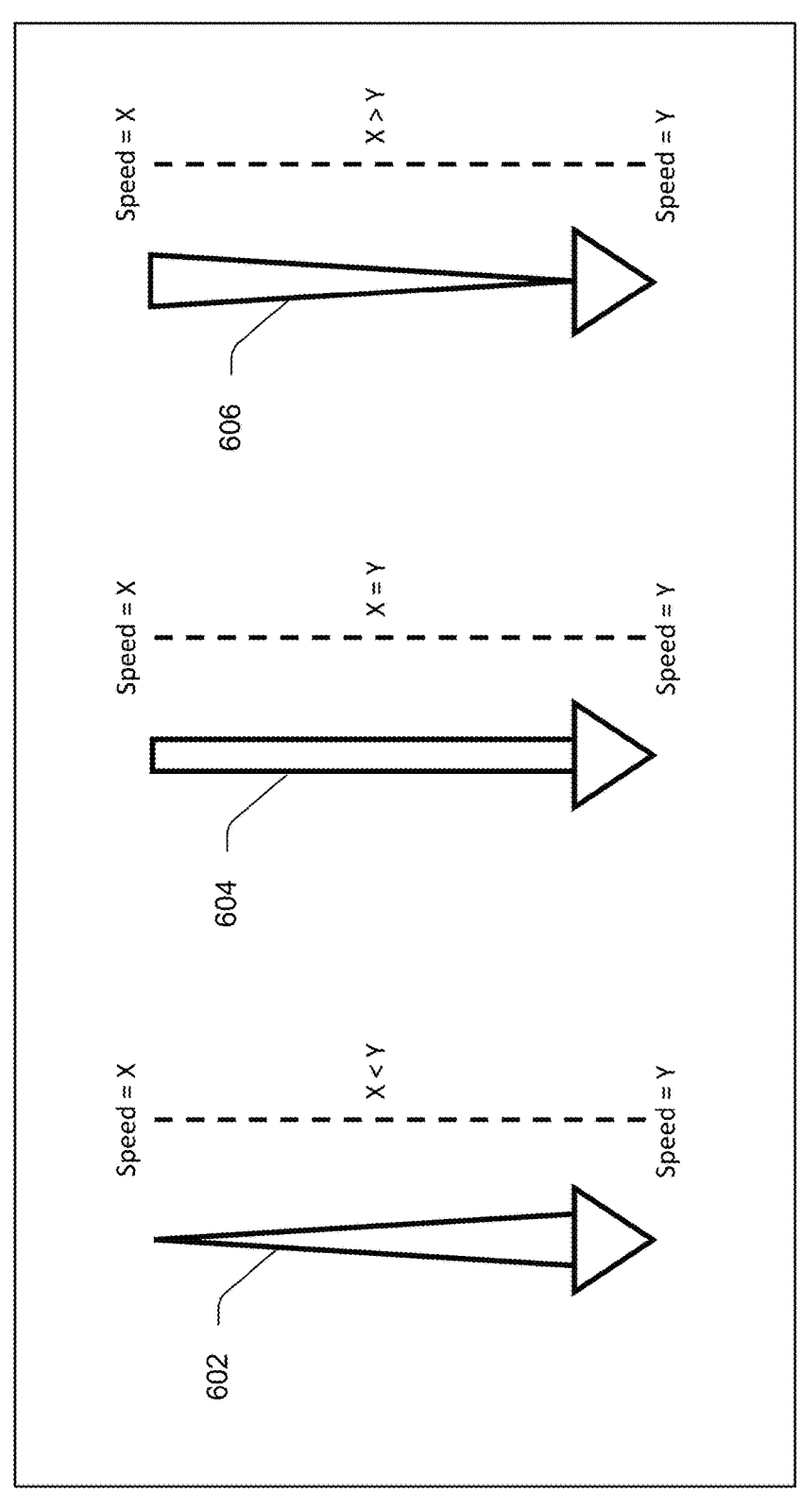
FIG. 6 depicts an example of different indications of variable rate of speed.

FIG. 6 depicts different indications of a variable rate of speed. For example, an indication of variable rate of speed 124 includes increasing speed or decreasing speed.

Figure 7:
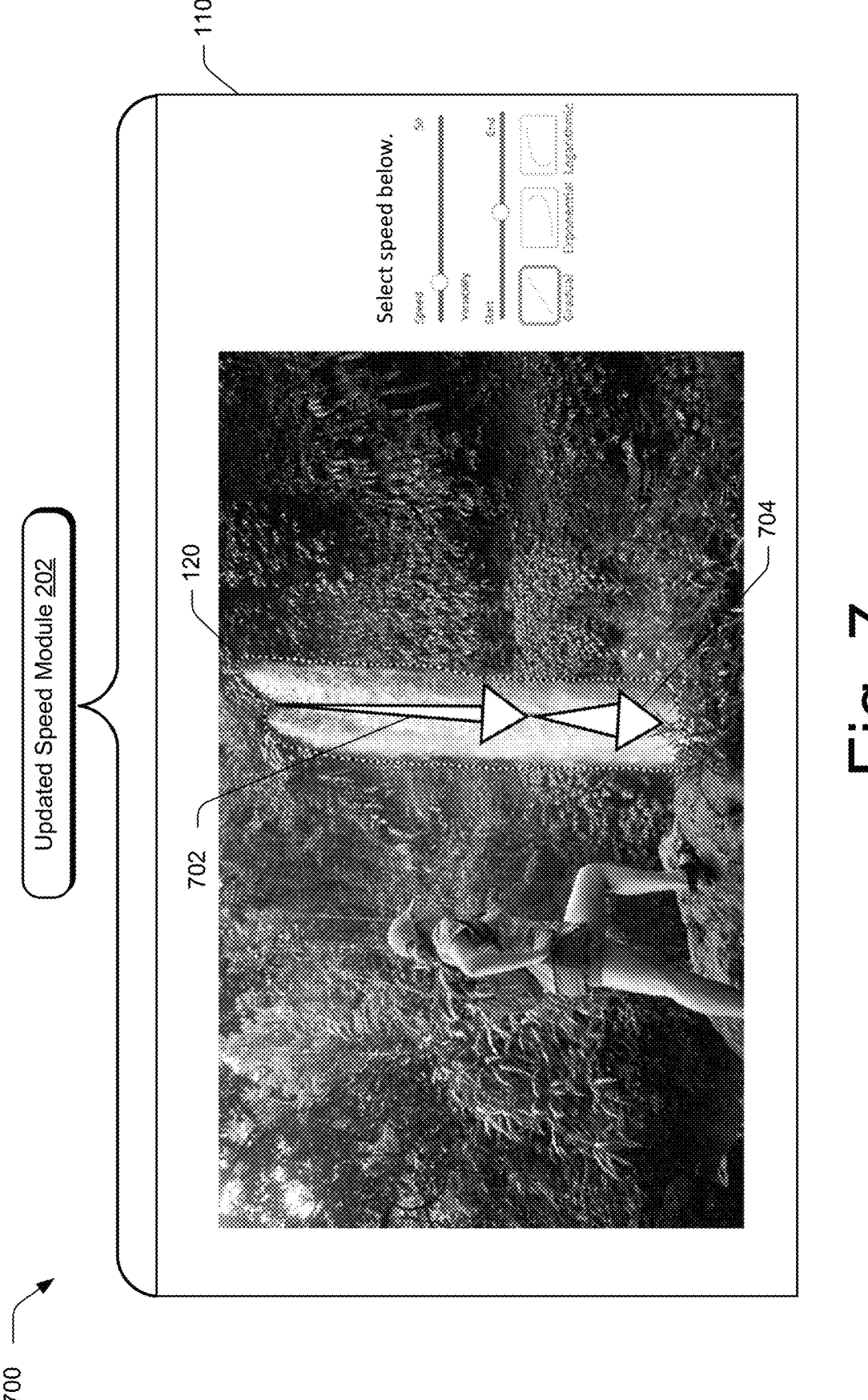
FIG. 7 depicts an example of generating video from an image based on variable speed with multiple arrows.

In this example, speed at the beginning of the arrow is represented as speed=X, and speed at the end of the arrow is represented as speed=Y. Increasing speed arrow 602 depicts variable speed that increases from the beginning of the arrow, where X<Y. Steady speed arrow 604 depicts steady speed, where X=Y. Decreasing speed arrow 606 depicts variable speed that decreases from the beginning of the arrow to the end of the arrow, where X>Y. The increasing speed arrow 602 and the decreasing speed arrow 606 also represents a variable rate of speed 124 that is linear, exponential, logarithmic, sinusoidal, or quadratic FIG. 7 depicts an example of generating video from an image based on variable speed with multiple arrows. FIG. 7 is a continuation of the example described in FIG. 3. After the variable speed module 116 receives the static digital image 120, the digital video module 204 receives an indication of a movement direction 122.

For example, the user draws multiple arrows over the static digital image 120 displayed in the user interface 110 to indicate a desired direction of movement. The user draws a first arrow 702 and a second arrow 704. The pointed ends of the first arrow 702 and the second arrow 704 point in the direction the user desires the pixels to move.

The indication of the movement direction 122 is based on the first arrow 702 and the second arrow 704. For example, the arrows drawn by the user are stored in an order of drawing in an arrow list (arrowList) represented by:

{arrow: start, end}

The variable speed module includes a machine learning model that determines a change in speed, A calculated based on a variability algorithm. For example, A between two consecutive arrows is calculated using the following equation:

$$\Delta = 1/fn(\text{variability})$$

The speed of each arrow is identified based on A, and the speed of each consecutive arrow is increased based on A. For example, the speed array is populated for the arrows by iterating over the arrow list to create an improvised input using:

```
while (! arrowList.empty())
    Speed = speed + (speed * Δ)
    Push speed to speedArray
    arrowList.pop()
    return speedArray
```

The machine learning model of the digital video module 204 then generates a realistic motion output in the digital video 126.

Some examples include multiple arrows, each one of the multiple arrows indicating a different movement direction. The movement direction is determined by the machine learning model based on a distance of a pixel from the arrow. For example, each pixel moves in the direction of the arrow the pixel is closest to. The digital video module 204 determines which arrow a pixel is closest to by calculating a shortest Euclidean distance between the pixel and an arrow. A Euclidean distance is a length of a line between two points. The pixel then moves in the movement direction indicated by the closest arrow. In other examples, the machine learning model determines the movement direction 122 using image recognition. For example, the machine learning model identifies a boundary of an object depicted in the digital image. The pixels within the boundary of the object are then animated to move in the movement direction 122 indicated by the arrow.

In this example, the user draws the first arrow 702 and the second arrow 704. The user also selects a button in the user interface labeled "Gradual" (Linear) variable rate of speed. In response, the updated speed module 208 identifies the variable rate of speed 124 based on the first arrow 702 and the second arrow 704. For example, speed increases linearly along the path of the consecutive arrows. Based on this, the updated speed module 208 generates updated moving pixels 210 by increasing the speed of the pixels along a path of movement from the beginning of the first arrow 702, toward the end of the first arrow 702, toward the beginning of the second arrow 704, and toward the end of the second arrow 704. In this example, the second arrow 704 is thicker than the first arrow 702 because velocities of pixels surrounding the second arrow 704 accelerate faster than velocities of pixels surrounding the first arrow 702. The digital video 126 including the updated moving pixels 210 gives the appearance that the water of the waterfall speeds up linearly toward the bottom of the waterfall.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

FIG. 8 depicts a procedure 800 in an example implementation of generating video from an image based on variable speed. At block 802, an input 118 is received including a static digital image 120 displayed in a user interface 110, an indication of a movement direction 122, and an indication of a variable rate of speed 124. For example, the variable rate of speed 124 is linear, exponential, logarithmic, sinusoidal, or quadratic. In some examples, the indication of the movement direction 122 is represented as an arrow 402 displayed in the user interface 110. Additionally or alternatively, a visual characteristic of the indication of the movement direction 122 varies proportionally with the variable rate of speed 124. In some examples, the indication of the movement direction specifies curved movement. Some examples further comprise multiple arrows, each one of the multiple arrows indicating a different movement direction. In some examples, the static digital image 120 is a portion selected by a user from within a larger digital image 302. Additionally or alternatively, the variable rate of speed 124 specifies speeding up or slowing down.

At block 804, a digital video 126 is generated based on the static digital image 120, the digital video 126 having pixels that move in the movement direction 122 at a speed that varies based on the variable rate of speed 124 based on pixels from the static digital image 120. In some examples, the movement direction 122 is determined based on a distance of a pixel from the arrow 402.

At block 806, the digital video 126 is displayed in the user interface 110. In some examples, the digital video 126 is displayed within the larger digital image 302.

FIG. 9 depicts a procedure 900 in an additional example implementation of generating video from an image based on variable speed. At block 902, an input 118 is received including a portion of a digital image displayed in a user interface 110, an indication of a movement direction 122, and an indication of a variable rate of speed 124. For example, the variable rate of speed 124 is linear, exponential, logarithmic, sinusoidal, or quadratic. In some examples, the indication of the movement direction 122 is represented as an arrow 402 displayed in the user interface 110. Additionally or alternatively, a visual characteristic of the indication of the movement direction 122 varies proportionally with the variable rate of speed 124. In some examples, the indication of the movement direction 122 specifies curved movement. Some examples further comprise multiple arrows, each one of the multiple arrows indicating a different movement direction.

At block 904, a digital video 126 is generated including pixels based on pixels of the digital image that move in the movement direction 122. In some examples, the movement direction 122 is determined based on a distance of a pixel from the arrow 402.

At block 906, individual speeds of the pixels are updated to vary based on the variable rate of speed 124.

At block 908, the digital video 126 is displayed relative to the digital image in the user interface 110.

Example System and Device

Figure 10:
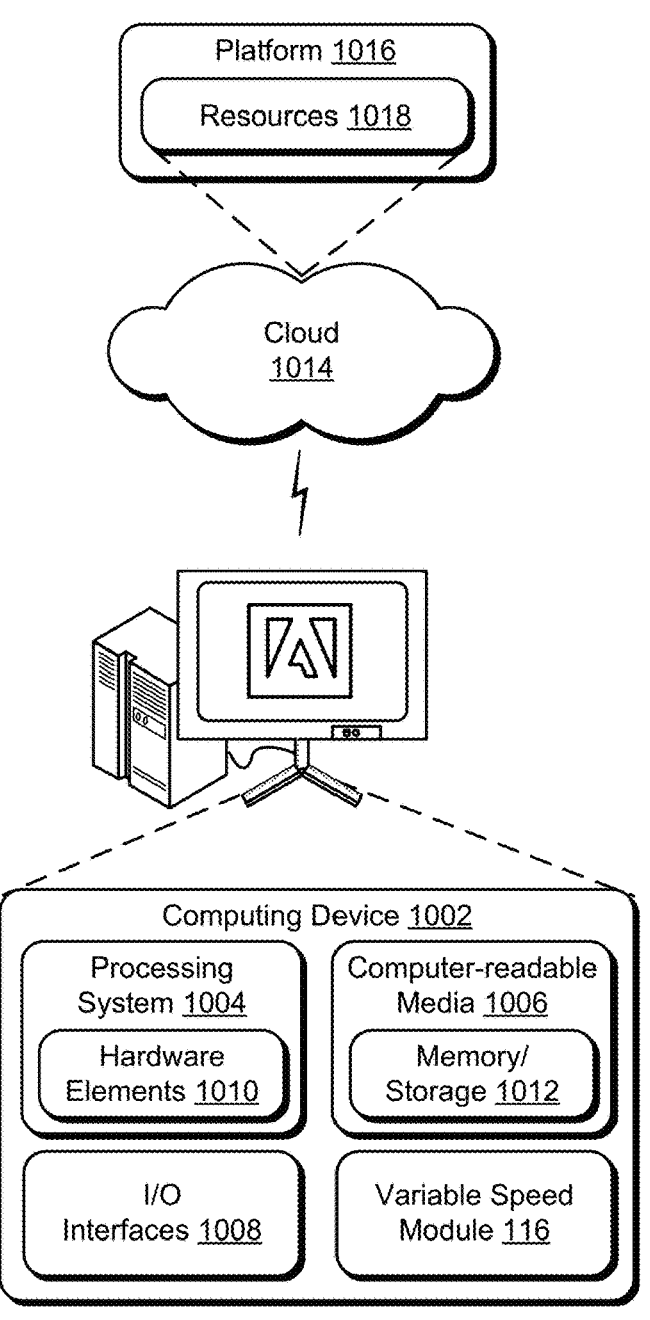
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the variable speed module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:
receiving, by a processing device, an input including:
a static digital image displayed in a user interface;
a plurality of arrows displayed over the static digital image that represent different movement directions; and
a selection of a rate of acceleration;
identifying, by the processing device, one or more regions of the static digital image by grouping pixels of the static digital image based on visual characteristics;
generating, by the processing device, a digital video based on the static digital image, the digital video having pixels within the one or more regions of the static digital image that move in one or more of the different movement directions, determined by a machine learning model based on a distance from each respective pixel to a closest arrow among the plurality of arrows, within the one or more regions at a speed that varies based on the rate of acceleration; and
displaying, by the processing device, the digital video in the user interface.

2. The method of claim 1, wherein the rate of acceleration is linear, exponential, logarithmic, sinusoidal, or quadratic.

3. The method of claim 1, wherein a width of a visual characteristic of an arrow of the plurality of arrows varies proportionally with the rate of acceleration.

4. The method of claim 1, wherein an arrow of the plurality of arrows specifies curved movement.

5. The method of claim 1, wherein the static digital image is a portion selected by a user from within a larger digital image and the digital video is displayed within the larger digital image.

6. The method of claim 1, wherein the rate of acceleration specifies speeding up or slowing down.

7. The method of claim 1, wherein the digital video includes moving pixels inside the one or more regions of the static digital image and static pixels outside the one or more regions of the static digital image.

8. The method of claim 1, wherein the visual characteristics involve a texture or a pattern formed by the pixels in the one or more regions of the static digital image.

9. The method of claim 1, wherein the plurality of arrows are drawn over the static digital image in the user interface.

10. The method of claim 1, wherein the rate of acceleration is selected from multiple rates of acceleration in the user interface.

11. A system comprising:
a memory component; and
a processing device coupled to the memory component, the processing device to perform operations comprising:
receiving an input including:
a portion of a digital image displayed in a user interface;
a plurality of arrows displayed over the digital image that represent different movement directions; and
a selection of a rate of acceleration;
identifying one or more regions of the digital image by grouping the pixels of the digital image based on visual characteristics;
generating a digital video including pixels based on pixels of the digital image within the one or more regions of the digital image that move in one or more of the different movement directions, determined by a machine learning model based on a distance from each respective pixel to a closest arrow among the plurality of arrows, within the one or more regions;
updating individual speeds of the pixels to vary based on the rate of acceleration; and
displaying the digital video relative to the digital image in the user interface.

12. The system of claim 11, wherein the rate of acceleration is linear, exponential, logarithmic, sinusoidal, or quadratic.

13. The system of claim 11, wherein a visual characteristic of an arrow of the plurality of arrows varies proportionally with the rate of acceleration.

14. The system of claim 11, wherein an arrow of the plurality of arrows specifies curved movement.

15. The system of claim 11, wherein the digital video includes moving pixels inside the one or more regions of the digital image and static pixels outside the one or more regions of the digital image.

16. The system of claim 11, wherein the visual characteristics involve a texture or a pattern formed by the pixels in the one or more regions of the digital image.

17. A non-transitory computer-readable storage medium storing executable instructions, which when executed by a processing device, cause the processing device to perform operations comprising:
receiving an input including:
a static digital image displayed in a user interface;
a plurality of arrows displayed over the static digital image that represent different movement directions; and
an indication of a rate of acceleration;
identifying one or more regions of the static digital image by grouping pixels of the static digital image based on visual characteristics;
generating a digital video including pixels based on pixels of the static digital image that move in one or more of the different movement directions, determined by a machine learning model based on a distance from each respective pixel to a closest arrow among the plurality of arrows, within the one or more regions;
determining an updated speed for each of the pixels within the one or more regions of the static digital image based on the rate of acceleration; and
displaying the digital video including the updated speed for each of the pixels in the user interface.

18. The non-transitory computer-readable storage medium of claim 17, wherein the rate of acceleration is linear, exponential, logarithmic, sinusoidal, or quadratic.

19. The non-transitory computer-readable storage medium of claim 17, wherein a visual characteristic of an arrow of the plurality of arrows varies proportionally with the rate of acceleration.

20. The non-transitory computer-readable storage medium of claim 17, wherein the digital video includes moving pixels inside the one or more regions of the static digital image and static pixels outside the one or more regions of the static digital image.

* * * * *